(12) United States Patent
Sharma

(10) Patent No.: US 11,617,005 B2
(45) Date of Patent: Mar. 28, 2023

(54) INTELLIGENT CONTENT PRIORITY ASSIGNMENT

(71) Applicant: DISH NETWORK TECHNOLOGIES INDIA PRIVATE LIMITED, Bangalore (IN)

(72) Inventor: Deepak Sharma, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 436 days.

(21) Appl. No.: 16/678,469

(22) Filed: Nov. 8, 2019

(65) Prior Publication Data

US 2021/0144432 A1    May 13, 2021

(51) Int. Cl.
*H04N 21/4335* (2011.01)
*H04N 21/4147* (2011.01)
*H04N 21/4402* (2011.01)

(52) U.S. Cl.
CPC ..... *H04N 21/4335* (2013.01); *H04N 21/4147* (2013.01); *H04N 21/4402* (2013.01)

(58) Field of Classification Search
CPC ........... H04N 21/4335; H04N 21/4147; H04N 21/4402
See application file for complete search history.

(56) References Cited

U.S. PATENT DOCUMENTS

2010/0086277 A1* 4/2010 Craner .................. H04N 5/76
386/278

* cited by examiner

*Primary Examiner* — Thai Q Tran
*Assistant Examiner* — Jose M Mesa
(74) *Attorney, Agent, or Firm* — Jeremiah J. Baunach; VLP Law Group LLP

(57) ABSTRACT

Systems, methods and devices are provided for managing media content storage priority and retention in a single- or multi-user environment. Indications of previous user activity are received regarding multiple portions of content stored via one or more storage devices. The previous user activity may include previous user deletion selections and/or previous user viewing selections of one or more of the multiple portions of content. A retention priority may be assigned to portions of media content based on the previous user activity. Responsive to receiving an indication of low available storage space on the one or more storage devices, a quantity of storage space on the one or more storage devices to make available is determined based on the previous user activity. Deletion of one or more portions of currently stored content is initiated based on the determined quantity of storage space to make available.

21 Claims, 4 Drawing Sheets

| Media Content | Associated User | Storage Date | Viewing Date | Deletion Date | Priority |
|---|---|---|---|---|---|
| Magnolia (1999) | Christine | 9/2/2017 | n/a | n/a | 1 |
| MacGyver S02E04 | Alan | 10/18/2017 | 10/30/2017 | n/a | 2 |
| Full House S05E12 | Bob | 3/4/2017 | 4/17/2017 | 4/17/2017 | 3 |
| Full House S05E13 | Bob | 3/5/2017 | 5/9/2017 | 5/9/2017 | 3 |
| Full House S05E14 | Bob | 3/6/2017 | 5/16/2017 | 5/16/2017 | 3 |
| Full House S05E15 | Bob | 3/7/2017 | n/a | n/a | 3 |
| ... | ... | ... | ... | ... | ... |
| The Magnificent Seven (1960) | Christine | 6/6/2017 | n/a | n/a | 3 |
| Saturday Night Live S43E07 | n/a | 9/22/2017 | 10/4/2017 | n/a | 4 |
| Saturday Night Live S43E08 | n/a | 9/29/2017 | 10/11/2017 | n/a | 4 |
| Top Gun (1986) | Christine | 7/2/2017 | 7/2/2017 | n/a | 5 |
| Jerry Macguire (1992) | Christine | 8/2/2017 | 8/2/2017 | n/a | 5 |
| ... | ... | ... | ... | ... | ... |

Fig. 3

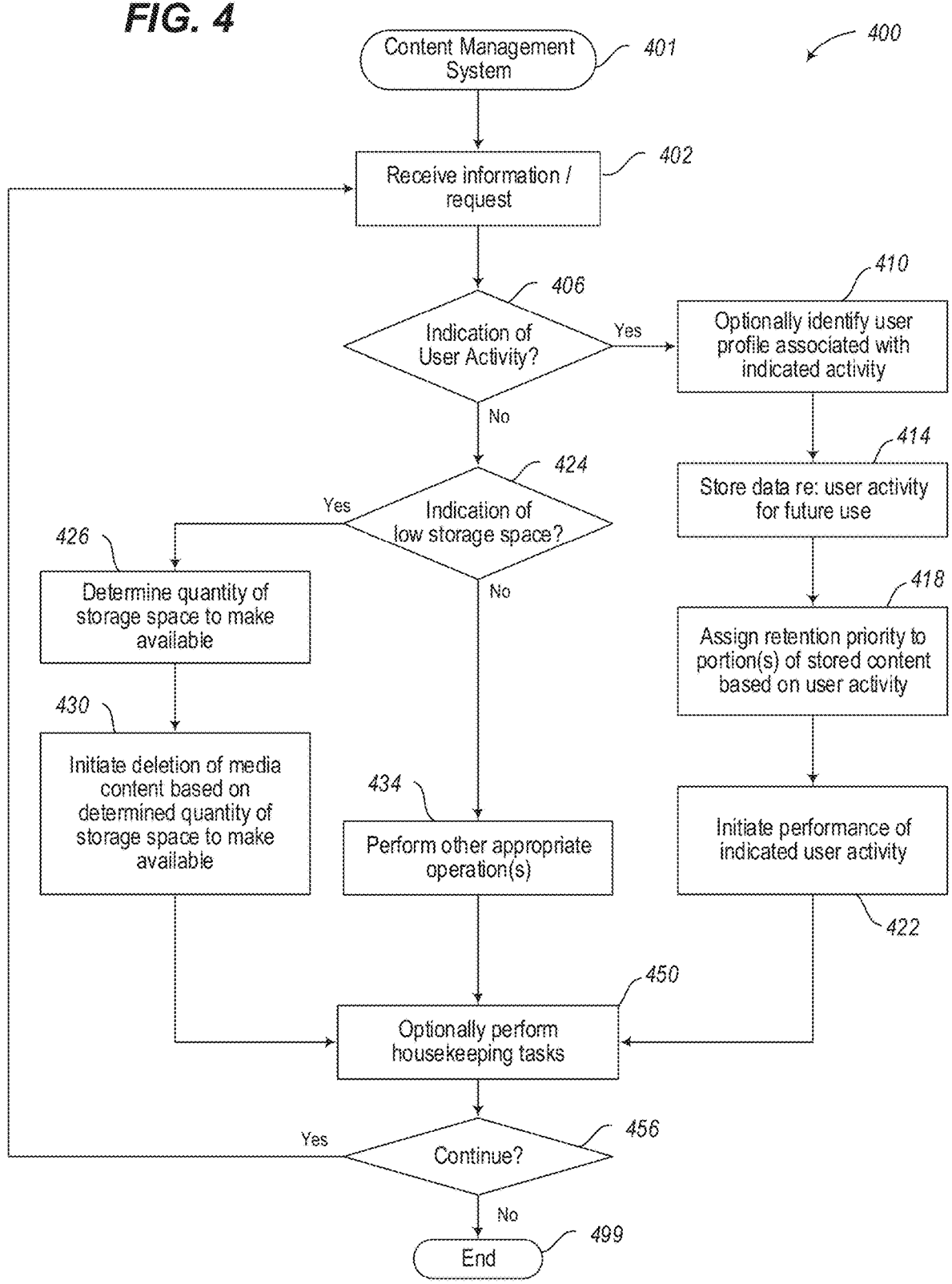

INTELLIGENT CONTENT PRIORITY ASSIGNMENT

BACKGROUND

Technical Field

The present disclosure generally relates to managing media content storage. More particularly, but not exclusively, the present disclosure relates to managing and prioritizing the retention and/or deletion of stored portions of multimedia content.

Description of the Related Art

In recent years, media content storage devices such as digital video recorders have significantly altered the manner in which many users consume media content such as television programming, streaming media content, and other audiovisual media content. A continued decrease in storage costs have resulted in such media content storage devices being able to store much more media content than previously available. Nonetheless, many users typically discover that in the process of storing and viewing their media content of choice, the storage capabilities of their own media content storage device are insufficient. For example, a user may request that their DVR "record" one or more portions of future media content (e.g., an upcoming TV show) only to discover that the DVR is "full"—i.e., that the media content storage device no longer has sufficient available storage space to store those portions of future media content without first deleting other media content already stored.

Thus, there is a need for devices and methods which may automatically determine a quantity of storage space to make available for one or more users of a media content storage device and the future media content that those users may wish to store.

BRIEF SUMMARY

Techniques described herein are generally directed to managing media content storage priority and retention in a single- or multi-user environment. Indications of previous user activity are received regarding multiple portions of media content stored via one or more storage devices. The previous user activity may include previous user deletion selections and/or previous user viewing selections of one or more of the multiple portions of media content. A retention priority may be assigned to portions of media content based on the previous user activity. Responsive to receiving an indication of low available storage space on the one or more storage devices, a quantity of storage space to make available on the one or more storage devices is determined based on the previous user activity, and deletion of one or more portions of currently stored media content is initiated based on the determined quantity of storage space to make available.

In at least one embodiment in accordance with techniques presented herein, a method for content management may be summarized as receiving one or more indications of previous user activity regarding multiple portions of content stored via one or more storage devices of a content management system, the previous user activity including previous user deletion selections of one or more of the multiple portions of content; receiving an indication of low available storage space on the one or more storage devices; responsive to receiving the indication of low available storage space and, based at least in part on the previous user deletion selections, determining a quantity of storage space on the one or more storage devices to make available; and, based at least in part on the determined quantity of storage space to make available, initiating deletion of at least one portion of content currently stored via the one or more storage devices.

In accordance with at least one additional embodiment, a content management system may be summarized as including one or more processors; one or more storage devices; and a computer-readable storage medium having stored instructions that, when executed by the one or more processors, cause the one or more processors to: receive one or more indications of previous user activity regarding multiple portions of content stored via one or more storage devices of a content management system, the previous user activity including previous user deletion selections of one or more of the multiple portions of content; receive an indication of low available storage space on the one or more storage devices; responsive to receiving the indication of low available storage space and based at least in part on the previous user deletion selections, determine a quantity of storage space on the one or more storage devices to make available; and, based at least in part on the determined quantity of storage space to make available, initiate deletion of at least one portion of content currently stored via the one or more storage devices.

In accordance with at least one other additional embodiment, a non-transitory computer-readable storage medium may be summarized as having stored instructions that, when executed by one or more computer processors, cause the one or more computer processors to perform various automated operations. The automated operations may include to receive one or more indications of previous user activity regarding multiple portions of content stored via one or more storage devices of a content management system, such that the previous user activity includes previous user deletion selections of one or more of the multiple portions of content; to receive an indication of low available storage space on the one or more storage devices; to determine, responsive to receiving the indication of low available storage space and based at least in part on the previous user deletion selections, a quantity of storage space on the one or more storage devices to make available; and, based at least in part on the determined quantity of storage space to make available, to initiate deletion of at least one portion of content currently stored via the one or more storage devices.

BRIEF DESCRIPTION OF THE SEVERAL VIEWS OF THE DRAWINGS

FIG. 3 partially depicts an exemplary data structure for managing media content storage priority and retention in accordance with one or more embodiments of techniques presented herein.

FIG. 4 depicts an exemplary operational routine for a Content Management System in accordance with one or more embodiments of techniques described herein.

DETAILED DESCRIPTION

Figure 1:
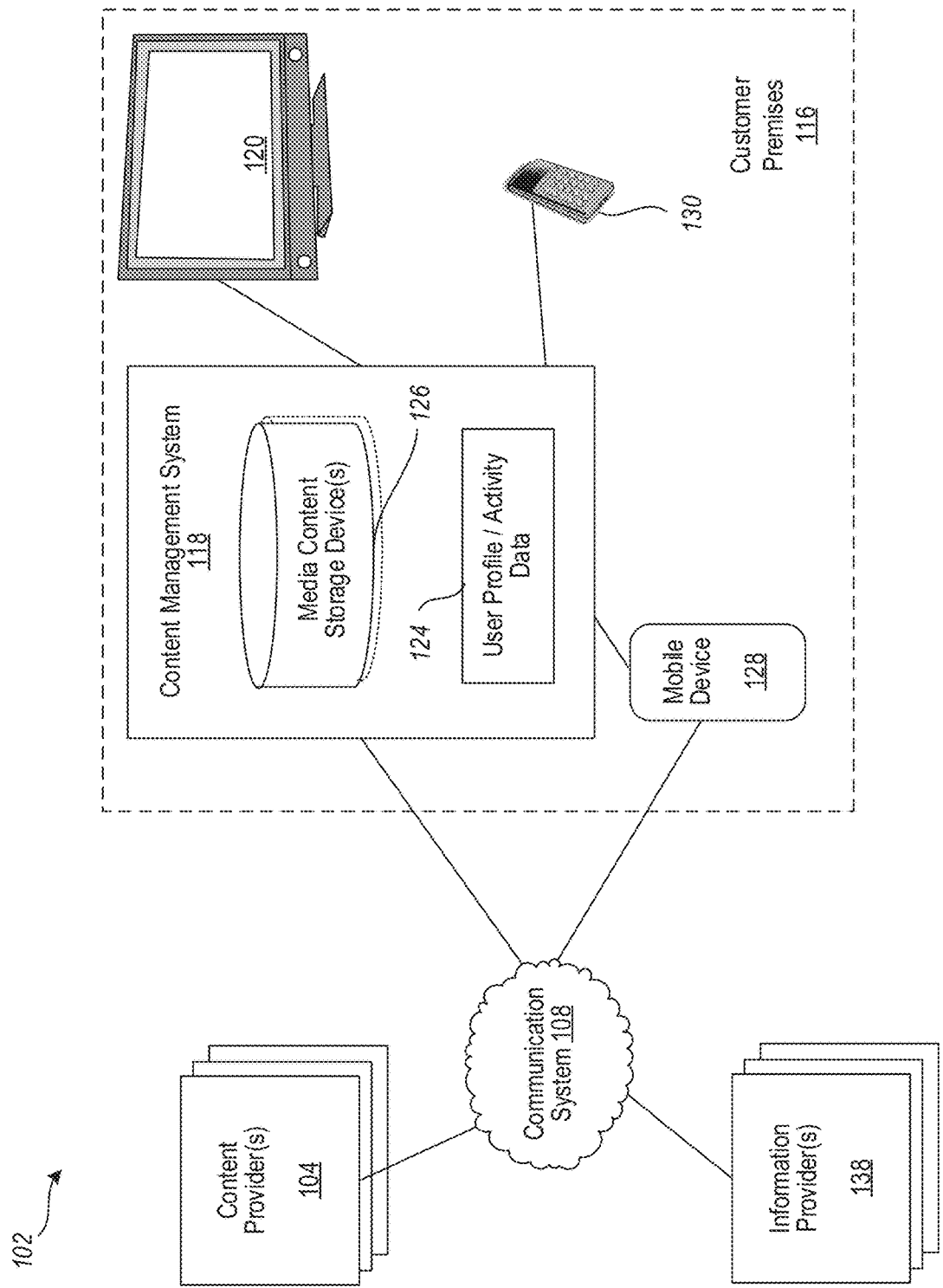
FIG. 1 is an overview block diagram illustrating a technical environment in which embodiments of systems and methods for managing media content storage priority and retention may be implemented, according to an exemplary embodiment of techniques presented herein.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, integrated circuits, logic gates, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Techniques herein are generally directed to enabling a Content Management System ("CM System") to perform automated operations for managing media content storage priority and retention and, in particular, managing one or more storage devices of the content management system based on one or more indications of previous user activity regarding portions of media content stored via the one or more storage devices. In certain embodiments, such previous user activity may include, as non-limiting examples, a selection by one or more users of one or more portions of media content for storage, viewing, and/or deletion.

In certain embodiments, the content management system may track and store data regarding such previous user activity with respect to one or multiple users, and may in certain scenarios determine one or more aspects of media content priority and retention based on such previous user activity. For example, the content management system may determine, such as (but not limited to) in response to an indication that an amount of available storage on the one or more storage devices has decreased below a threshold, a quantity of additional storage space to make available based on a user's history of deleting media content. In certain embodiments, the content management system may initiate making the determined amount of storage available by deleting one or more portions of stored media content from the one or more storage devices based on a degree of similarity of such media content with other media content with which one or multiple users of the content management system has interacted—e.g., media content that a user has previously viewed and then deleted, deleted without viewing, requested to be permanently or indefinitely stored by the content management system regardless of whether the media content has been viewed by the user, etc.

FIG. 1 is an overview block diagram illustrating a technical environment 102 in which embodiments of systems and methods for managing media content storage priority and retention may be implemented in accordance with one exemplary embodiment.

Before providing additional details regarding the operation and constitution of systems and methods for managing media content storage priority and retention, the exemplary technical environment 102, within which such embodiments may operate, will briefly be described.

In the technical environment 102, audio, video, and/or data service providers, such as television service providers, provide their customers a multitude of video and/or data programming (herein, collectively "programming," "media content," or "content"). Such programming is often provided as a program content stream for use by a Content Management System 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In various embodiments, the Content Management System 118 may receive various indications of user activity regarding one or more portions of media content that may be currently, previously, or prospectively stored by the CM System 118 for consumption (e.g., listening and/or viewing) on behalf of one or more of its users. As described elsewhere herein, an indication of such user activity may be received in multiple ways and from various sources, such as via a mobile device 128, remote-control 130, one or more user interfaces provided by the CM System, physical interface elements provided by or communicatively coupled to the CM System and/or presentation device 120. Non-limiting examples of such user activities may include user-initiated selections of one or more portions of media content for immediate or future storage (such as to "record" a television program being distributed via communication system 108 or other manner); for consumption; for assigning a user-specified retention status, such as to indicate that a portion of media content should be immediately deleted, deleted whenever storage space associated with the user within the CM System falls below a threshold, retained indefinitely, or other criteria. In addition, certain user activities may be tracked and analyzed by the CM System without a direct indication of such activity being initiated by a user. For example, the CM System may in certain embodiments aggregate data regarding particular portions of media content viewed by one or more users, including data regarding a period of time during which a portion of media content was stored but not viewed, a frequency with which one or more users viewed portions of stored or other media content, a frequency with which one or more users deleted portions of stored or other media content, particular times or days in which a frequency of one or more various user activities increased or decreased, etc.

In at least some embodiments, the CM System 118 may associate specific user activities and or portions of media content with one or more particular users out of multiple distinct users of the CM System. For example, a user profile may be associated with a current session of the CM System, such as if a user "logs in" or otherwise directly identifies themselves when interacting with the CM System. As another example, the CM System may, in certain embodiments, accept voice or other biometric input (such as via I/O devices 204 or mobile device 128, with reference to FIG. 2), and may further include voice recognition or other biometric recognition capabilities to identify a particular user profile associated with the accepted biometric input. In certain embodiments, the CM System may track and/or analyze various aspects of user activity individually, based on one or more identified groups of users (e.g., family members, neighbors, roommates, etc.), or as a whole.

In certain embodiments, the CM System 118 may monitor and detect various conditions regarding the storage capabilities of media content storage devices associated with the CM System. For example, the CM System may track an amount of available storage associated with each of one or more users, such as if the associated storage devices contain physical and/or logical partitions corresponding to those users. As another example, the CM System may monitor an amount of total or available storage on such storage devices and/or individual partitions irrespective of user-based considerations. In various embodiments, the CM System 118 may generate, provide, and/or take action in response to one or more notifications regarding such storage conditions, such as to generate an alert when available storage space (either in total, associated with a particular user, or otherwise) falls below a defined threshold. In certain embodiments, such a defined threshold may be set in accordance with one or more user preferences and associated with one or more distinct user profiles maintained by the CM System. In other embodiments, the defined threshold may be selected as an operating parameter of the CM System, as an operating parameter of a particular storage device or partition, or in any other suitable manner.

In response to such monitoring, or to a notification generated based on that monitoring, the CM System 118 may take various actions, including to initiate one or more operations to release or reclaim storage space on one or more storage devices. As part of such operations, the CM System 118 may determine an amount of storage space to make available, such as based on data regarding one or more previous user activities. For example, in certain embodiments the CM System may determine the amount of storage space to make available based on previous deletions (including a frequency of such deletions) initiated by one or more users. It will be appreciated that individual users may delete particular portions of media content with distinct frequencies. User A, for example, may view media content stored by the CM System without ever manually initiating the deletion of that viewed media content; User B may regularly delete portions of stored media content with or without viewing those portions; User C may often delete many such portions of stored media content at once, but only do so at irregular intervals. In at least one embodiment, the CM System may therefore determine a quantity of available storage space to make available for future storage of media content based on the distinct frequencies with which respective users initiate the storage, viewing, and/or deletion of media content currently or previously stored. For example, if User B routinely deletes portions of stored media content upon viewing (or even if such content has not been viewed), the CM System may determine that portions of media content associated with User B need not be automatically deleted at all, or that if additional available storage space is needed, a relatively small quantity of such storage space is to be released. In contrast, if User A rarely or never deletes such portions of media content, the CM System may determine that a larger quantity of available storage space (such as may currently be utilized by media content associated with User A) is to be released.

In an embodiment, the CM System 118 may assign a retention priority to one or more individual portions of media content based on various criteria. As non-limiting examples, the CM System may assign such a retention priority based on user activities with respect to the individual portion of media content and/or similar portions of media content (e.g., media content that is part of the same television series, or that shares one or more common cast members, directors, screenwriters, etc.) that are currently or have been previously stored by the CM System on behalf of a single or multiple users.

In various scenarios and embodiments, the CM System may determine a retention priority value to assign based on a respective priority associated with individual users of the CM System. For example, the CM System may associate a higher respective user priority with a user that is associated with a greater quantity of media content being stored by the CM System, such as if User B has initiated the storage of a high percentage of all media content being stored. As another example, the CM System may associate a higher respective user priority to users that more regularly view those portions of media content being stored by the CM System, such as if User A is the user that initially views a majority of the stored media content. It will be appreciated that a variety of prioritization schema may be used to respectively prioritize users and/or media content by one or more embodiments of the CM System without deviating from the techniques described herein.

In at least one embodiment, the CM System 118 comprises a device such as a set-top box, television, DVR, DVD player, PC, tablet device, game machine, smart phone, mobile device or other computing device or media player configured to receive and store media content via a connection to a satellite or cable television service provider or Internet service provider outside the customer premises 116, and to display such media content on a presentation device 120. For example, the CM System 118 may be configured to receive, process and display on the presentation device 120 media content received directly from the satellite or cable television service provider, such as cable or satellite television broadcasts via various physical and logical channels of communication of communication system 108. Also, the CM System 118 may be configured to receive, process and display on the presentation device 120 streaming media content received directly from the satellite or cable television service provider and/or other content provider 104. In addition, the CM System 118 may be configured to process and display on the presentation device 120 one or more portions of media content stored locally by the receiving device, such as via media content storage devices 126.

In operation, the CM System 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The CM System 118 may receive and store a plurality of media content by way of the communications media or sources, or may only receive media content via a particular channel or source. In some embodiments, based upon selection by a user, the CM System 118 processes and communicates the selected media content to the presentation device 120, either prior to, simultaneously with, or after restoring such media content via media content storage devices 126.

Examples of a CM System 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the CM System 118 may be any suitable converter device or electronic equipment that is operable to receive and store media content received via a connection to a satellite or cable television service provider or other source outside the customer premises 116 and communicate that media content to another device. Further, the CM System 118 may itself provide one or more user interface elements via presentation device 120, and in certain embodiments may include user interface devices, such as touch-sensitive display components, buttons, switches, or any other physical actuators. In some exemplary embodiments, the CM System 118 may be configured to receive and decrypt content and/or software or firmware updates according to various digital rights management (DRM) and other access control technologies and architectures as part of or in addition to the process of managing media content storage priority and retention, which will be described in further detail below. In some embodiments, the CM System 118 may be provided by a cable provider, satellite provider, or other entity to which the customer may subscribe to receive television services and/or other programming through other channels using a terrestrial, satellite signal, and/or cable television format.

In certain embodiments, including that depicted by FIG. 1, the CM System 118 may track and store data regarding activities selected and/or initiated by one or more users of the CM System. For example, the CM System 118 may in certain embodiments store user profile and activity data 124 related to a user's previous actions with respect to portions of media content currently or previously stored by the CM System 118 via media content storage devices 126. User profile and activity data 124 may include data regarding user activities related to portions of media content prospectively selected for viewing or storage by that user or other users, such as upcoming programs to be recorded and stored for later viewing by CM System 118. In at least some embodiments, user profile and activity data 124 may be tracked and maintained by the CM System with respect to multiple users.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smartphone, mobile device or other computing device or media player, and the like. Presentation devices 120 may typically employ a display, one or more speakers, and/or other output devices to communicate video and/or audio content to a user. In some embodiments, presentation devices 120 employ a microphone, keyboard, and/or other input devices to communicate commands or other input to the presentation device 120 and/or CM System 118. In many implementations, one or more presentation devices 120 reside in or near a customer premises 116 and are communicatively coupled, directly or indirectly, to the CM System 118. Further, in certain implementations the CM System 118 and the presentation device 120 may be integrated into a single device. Such a single device may have the above-described functionality of the CM System 118 and the presentation device 120, and may include additional functionality.

In certain embodiments including that depicted in FIG. 1, one or more users may provide an indication of one or more desired activities with respect to media content via a remote control device (remote control) 130, which may be operable to control various aspects of the CM System 118 and/or the presentation device 120. The remote control 130 typically communicates with the CM System 118 using a suitable wireless medium, such as infrared (IR), radio frequency (RF), or the like. The remote control 130 may include a microphone that may be voice or audio activated by a user in order to receive commands or other voice input from that user. In some embodiments, such voice input may be communicated to and used by the CM System 118, presentation device 120 and/or mobile device 128 and cause such devices to perform other actions. For example, such voice input may be processed by the CM System 118, presentation device 120 and/or mobile device 128 as an indication of one or more desired activities with respect to media content stored or otherwise presented by such systems. In some embodiments, the remote 130 may be a voice-enabled remote and the same microphone may also be used to receive voice commands from the user and transmit corresponding commands to the CM System 118 to control the CM System 118 and/or other peripheral devices.

In at least the exemplary embodiment shown in FIG. 1, one or more users may provide an indication of one or more desired activities with respect to media content via a mobile device 128, which may be communicatively connected to the CM System 118 via a physical or a peer-to-peer short range wireless connection. For example, mobile device 128 may be a handheld mobile device of a user (e.g., a customer of a satellite, cable or streaming media subscription service associated with customer premises 116 or other user) such as a smartphone, tablet device or other computing or communications device. There may be fewer or additional mobile devices in various embodiments. The mobile device 128 may communicate over communication system 108 with the CM System 118, content providers 104 and/or information providers 138, such as by using a transmission control protocol/Internet protocol (TCP/IP) suite of networking communication protocols or other communication protocols. The mobile device 128 may also or instead communicate directly with the receiving device 128, remote control 130 and/or presentation device 120 over one or more short range wireless networks or peer-to-peer networks. In the present example, a cable or satellite television service provider may encompass or be in communication with some or all of content providers 104 and information providers 138. In certain scenarios and embodiments, mobile device 128 may be provided by one of content providers 104, information providers 138, a program distributor (such as a cable provider or satellite provider), or other entity. However, in some instances, such mobile devices may be various personal user devices such as a tablet device, game machine, smartphone, mobile device or other computing device, media player, or communications device.

In certain scenarios and embodiments, content providers 104 may provide one or more portions of media content to the CM System via an intervening third-party distributor, such as a satellite service provider, cable television service provider, and/or other service provider. Exemplary content providers include television stations which provide local or national television programming and special content providers which provide premium based programming, streaming services, pay-per-view programming and on-demand programming. In at least certain embodiments, one or more portions of this collective media content may be received and stored by the CM System 118 (such as via media content storage devices 126) for future presentation to one or more of multiple users.

In operation, media content may be provided to the CM System 118 by one or more content providers 104 via any suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

As noted elsewhere herein, in at least some embodiments, CM System 118 includes media storage capabilities to enable one or more users of the CM System to request or initiate various activities with respect to one or more portions of media content stored via media content storage 216. As non-limiting examples, a user of the CM System may interact with the CM System 118 via user interface 228 in order to view upcoming programming available for recording; to select particular upcoming programming for storage (also colloquially termed "recording") by the receiving device; to select portions of media content (whether broadcast, streaming, stored by the CM System 118, or otherwise available) for viewing; to manually assign a retention priority to one or more portions of media content, such as to indicate that a particular program may be deleted once viewed or, alternatively, that a particular program should be stored by the CM System 118 indefinitely, regardless of whether that program has already been viewed; or to select portions of media content currently stored by the receiving device for deletion, such as to manually make available additional storage space of the receiving device. As noted elsewhere herein, the user may interact with CM System 118 and user interface 228 via one or more user interface devices, such as mobile device 128, remote control 130, or other input device.

In addition, information provider 138 may provide various forms of content and/or services to various devices residing in the customer premises 116. For example, information provider 138 may provide information to the CM System 118 regarding customer or user accounts associated with one or more portions of media content and/or CM System 118; corresponding user preferences and settings (such as may be stored as part of user profile and activity data 124); and/or additional processing of such media content. Such services may include artificial intelligence and machine learning functionality to improve the managing of media content priority and retention in general and for particular portions of media content, such as based on user interactions via the CM System 118, remote control 130, mobile device 128 and/or receiving devices and mobile devices of other users.

The above description of the environment 102, the customer premises 116, and the various devices therein, is intended as a broad, non-limiting overview of an exemplary environment in which various embodiments of techniques presented herein for managing media content storage priority and retention may be implemented. FIG. 1 illustrates just one example of an environment 102 and the various embodiments discussed herein are not limited to such environments. In particular, environment 102 and the various devices therein, may contain other devices, entities, systems and/or media not specifically described herein. In various embodiments, each of the content providers 104 and information providers 138 may represent one or more of such entities or systems.

It will be appreciated that in certain embodiments, various functionality of a CM System and related techniques described herein may be performed at least in part by various other devices than those specifically described herein, such as audio and DVD players, digital recorders, computers, peripherals, televisions, mobile devices, active speakers, headphones, telephones, and other electronic devices, etc. In the following description, numerous specific details are set forth, such as data formats, program sequences, processes, and the like, in order to provide a thorough understanding of the described techniques. In addition, it will be appreciated that in various embodiments, various functionality described with respect to the CM System may be performed locally or remotely with respect to various devices and locations described herein, such as if one or more processing tasks related to the prioritization of media content stored by the CM System are performed by one or more remote computing servers. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
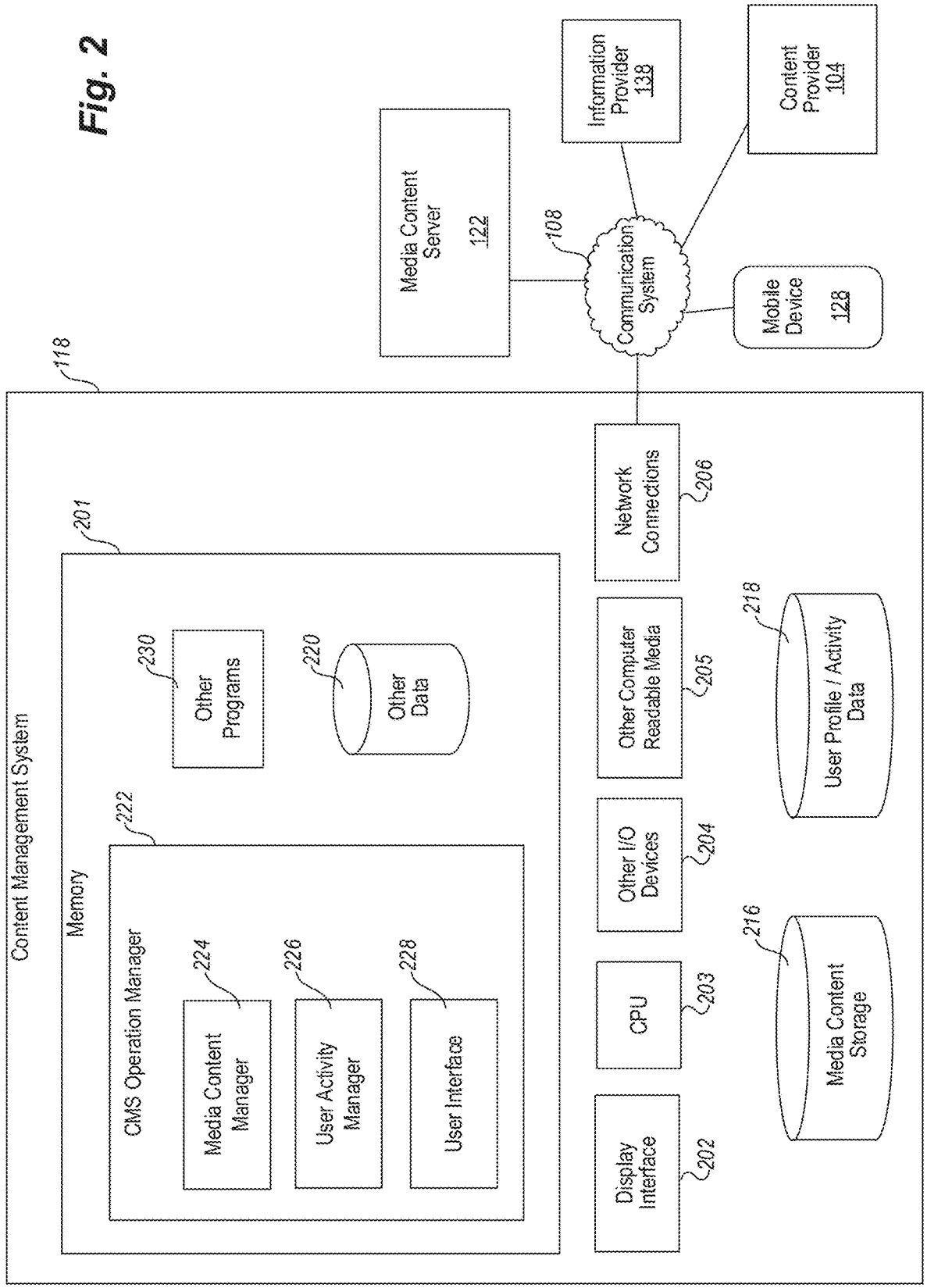
FIG. 2 is a block diagram illustrating elements of an exemplary Content Management System used in systems and methods for managing media content storage priority and retention, according to an exemplary embodiment of techniques presented herein.

FIG. 2 is a block diagram illustrating elements of an exemplary CM System 118 used in communications between media devices, according to one exemplary embodiment.

In the depicted embodiment, the CM System 118 is a device such as a set-top box, television, DVR, DVD player, PC, tablet device, game machine, smartphone, mobile device or other computing device or media player configured to receive one or more portions of media content via a connection to a satellite service provider, cable television service provider, or other service provider external to the customer premises, and to display such media content on a presentation device. For example, in the depicted embodiment the CM System 118 is configured to receive, store, process and display on a presentation device 120 one or more portions of media content received directly from content providers 104 and/or information providers 138 via various physical and logical channels of communication.

In certain embodiments, the CM System 118 may comprise one or more general purpose or special purpose computing systems/devices to store information related to the CM System 118 and its users; to store metadata; to perform DRM and key management operations; to decrypt and encrypt received content; to pair with various mobile devices on a home LAN and/or over the Internet; to establish one or more connections between the CM System 118 and various mobile devices; to communicate data, including media content, between the CM System 118 and various mobile devices (including mobile device 128) via a home LAN and/or Internet; and communicate with content providers 104 and/or information providers 138. In addition, in some embodiments, the CM System 118 may comprise one or more distinct computing systems/devices and may span distributed locations. For example, while embodiments specifically described herein may indicate that media content storage devices 126 are incorporated within the CM System 118 and operate locally to customer premises 116, in certain embodiments the CM System may include one or more remote storage devices. For example, media content storage devices 126 may be provided remotely by one or more remote service providers (e.g., one of content providers 104, information providers 138, cloud storage service, or other service provider), and may comprise one or more partitions designated for use by the CM System 118 or one or more users thereof. Furthermore, each block shown may represent one or more such blocks as appropriate to a specific embodiment or may be combined with other blocks. Also, the CMS operation manager 222 may be implemented in software, hardware, firmware, or in some combination to achieve the capabilities described herein.

In the embodiment shown, CM System 118 comprises a computer memory ("memory") 201, a display interface 202 for communication with a display device (such as presentation device 120 of FIG. 1), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206. The CMS operation manager 222 is shown residing in memory 201. In the depicted embodiment, the CMS operation manager 222 includes a media content manager 224, such as may initiate or implement various operations to manage, maintain, store, display, and eliminate portions of media content from the CM System; a user activity manager 226, such as may track, analyze, store, and provide data regarding current and previous user actions performed in relation to the CM System and/or portions of media content provided thereby; and a user interface 228.

It will be appreciated that in various other embodiments, some portion of the contents and some, or all, of the components of the CMS operation manager 222 may be stored on and/or transmitted over the other computer-readable media 205. The components of the CM System 118 and CMS operation manager 222 preferably execute on one or more CPUs 203 and facilitate the receiving, decrypting, decoding, processing, selecting, recording, playback and displaying of programming, as well as the establishing of an Internet Layer end-to-end security connection, such as a secure IP tunnel, over the home LAN and/or Internet between the CM System 118 and various mobile devices and communication of data, including one or more portions of media content, between the CM System 118 and various mobile devices via the Internet Layer end-to-end security connection over the home LAN and/or Internet, as described herein. The CMS operation manager 222 may also facilitate on-demand media services (e.g., VOD services), on-demand program ordering, processing and DRM and key management and storage corresponding to processing received streaming media content and other programming. The CMS operation manager 222 may operate as, be part of, or work in conjunction and/or cooperation with various on-demand service software applications stored in memory 201 and on various mobile devices. The CMS operation manager 222 also facilitates communication with peripheral devices such as a remote control, via the I/O devices 204, and with the mobile device 128 and remote systems (e.g., content providers 104 and information providers 138) via the network connections 206.

Recorded or otherwise stored media content, corresponding to one or more program content streams received as streaming media content or other types of programming, may reside on the media content storage 216, either in decrypted or encrypted form as applicable for storing, processing and displaying of the received media content. In certain embodiments, the media content storage 216 may also store various generated supplemental content, such as program metadata associated with the stored media content and/or supplemental content stored in the media content storage 216. Non-limiting examples of such supplemental content include DRM data; tags; codes, identifiers, format indicators, timestamps, user identifications, authorization codes, digital signatures, etc.

Other code or programs 230 (e.g., further audio/video processing modules, a program guide manager module, a Web server, and the like), and potentially other data repositories, such as data repository 220 for storing other data (user profiles, preferences and configuration data, etc.), may also reside in the memory 201, and preferably execute on one or more CPUs 203. Of note, one or more of the components in FIG. 2 may or may not be present in any specific implementation.

In some embodiments, the CM System 118 and CMS operation manager 222 include an application program interface ("API," not specifically shown) that provides programmatic access to one or more functions of the CM System 118 and CMS operation manager 222. For example, such an API may provide a programmatic interface to one or more functions of the CMS operation manager 222 that may be invoked by one of the other programs 230, a remote control 130, the mobile device 128, content providers 104, information providers 138, or some other module or entity. In this manner, the API may facilitate the development of third-party software, such as various different on-demand service applications, user interfaces, plug-ins, adapters (e.g., for integrating functions of the CMS operation manager 222 into mobile device and/or desktop applications), and the like to facilitate managing media content storage priority and retention using the CM System 118.

In an exemplary embodiment, one or more components of the CM System 118 and CMS operation manager 222 may be implemented using standard programming techniques. For example, the CMS operation manager 222 may be implemented as a "native" executable running on the CPU 203, along with one or more static or dynamic libraries. In other embodiments, various functionality of the CM System 118 and CMS operation manager 222 may be implemented as instructions processed by a virtual machine that executes as one of the other programs 230. In general, a range of programming languages known in the art may be employed for implementing such exemplary embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

Embodiments of techniques described herein may also utilize well-known or other synchronous or asynchronous client-server computing operations. However, the various components may be implemented using more monolithic programming techniques as well—for example, as an executable running on a single CPU computer system, or alternatively decomposed using a variety of structuring techniques known in the art, including but not limited to multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a CMS operation manager 222 implementation. Also, other functions could be implemented and/or performed by each component/module, and in different orders, and by different components/modules, yet still achieve the functions of the CM System 118 and CMS operation manager 222.

In addition, programming interfaces to the data stored as part of the CM System 118 and CMS operation manager 222, may be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. One or more of media content storage 216, user profile and activity data store 218, and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing components of the described embodiments in a distributed manner, including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the CMS operation manager 222.

Furthermore, in some embodiments, some or all of the components of the CM System 118 and CMS operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

It will be appreciated that in some embodiments, the Content Management System may include more components than illustrated, may include fewer components than illustrated, may split illustrated components into separate components, may combine illustrated components, etc., and various combinations thereof.

FIG. 3 partially depicts a data structure 301 associated with one or more storage devices of a Content Management System in accordance with techniques described herein, the features and functionality of which may be substantially similar to those described above with respect to CM System 118 of FIGS. 1-2.

In particular, the data structure 301 comprises a data table that includes various records regarding portions of media content currently or previously stored by the one or more storage devices. In the depicted embodiment, data structure 301 includes a media descriptor field 305, indicating a title of each respective portion of media content; an associated user field 310, indicating a particular user associated with each respective portion of media content (such as if that user initiated the storage and/or viewing of the associated media content); an associated storage date field 315, indicating a date on which the respective portion of media content was initially stored by the CM System; an associated viewing date field 320, indicating a date on which the respective portion of media content was initially viewed by a user of the CM System; an associated deletion date field 325, indicating a date on which the respective portion of media content was selected for deletion by a user; and an associated retention priority field 330, indicating a retention priority value assigned to the respective portion of media content by the CM System either responsive to an explicit user request (e.g., a request to keep a particular portion of media content stored indefinitely) or based on an analysis by the CM System of one or more previous user activities associated with the respective portion of media content and/or additional portions of media content related to the respective portion. As one non-limiting example, the CM System may assign a retention priority value to all episodes of a television series based at least in part on previous user activities initiated with respect to individual episodes of that television series.

It will be appreciated that in various scenarios and embodiments, a data structure associated with stored media content and maintained by an embodiment of the CM System 118 may include additional data not depicted in the embodiment of FIG. 3, may omit certain data depicted in the illustrated embodiment, or distinguish itself from the illustrated embodiment in a variety of other ways while still operating in accordance with techniques presented herein. For example, in various embodiments, a CM System may track additional data fields related to distinct users' activities with respect to a portion of media content, such as if Bob requested to store a particular episode of a television show, but that Christine first viewed the episode, and Alan then initiated its deletion at a later date.

FIG. 4 depicts an exemplary operational routine 400 for a Content Management System 401 (the features and functionality of which may be substantially similar to those described above with respect to CM System 118 of FIGS. 1-2) comprising one or more processor-based devices in accordance with one or more embodiments of techniques described herein.

The operational routine 400 begins with block 402, in which a processor-based device receives information or a request.

At block 406, a processor-based device determines whether the received information or request is an indication of user activity, such as with respect to one or more portions of media content stored by the CM system 401.

If in block 406 it was determined that the received information or request is an indication of user activity, the routine proceeds to block 410, in which a processor-based device optionally identifies a user profile associated with the indicated activity. The routine then proceeds to block 414.

At block 414, a processor-based device stores data regarding the indicated user activity for future use, such as via user profile and activity data storage 218 of FIG. 2. The routine then proceeds to block 418.

At block 418, a processor-based device assigns a retention priority to one or more portions of stored media content based on the indicated user activity. In certain scenarios and embodiments, assigning the retention priority may be based only on the immediately indicated user activity; alternatively, as described in greater detail elsewhere herein, a processor-based device may assign a retention priority to portions of stored media content based on an analysis of one or more subsets of previous user activities. The routine proceeds to block 422.

At block 422, a processor-based device initiates performance of the indicated user activity. For example, if the indicated user activity is a request to record an upcoming program, a processor-based device may schedule to record the upcoming program. As another example, if the indicated user activity indicates that one or more portions of stored media content are to be deleted, a processor-based device may immediately initiate a release of the storage currently occupied by the indicated media content.

If in block 406 it was determined that the information or request received in block 402 was not an indication of user activity, the routine thereafter proceeds to block 424, in which a processor-based device determines whether the received information or request comprises an indication of low storage space. As one example, the received information may indicate that available storage space on one or more storage devices of the CM System has decreased below a defined threshold. If it is determined that the received information or request does comprise an indication of low storage space, the routine proceeds to block 426.

At block 426, a processor-based device determines a quantity of storage space to make available on the CM System. As described in greater detail elsewhere herein, the quantity of storage space to make available may be determined in at least some embodiments based on one or more aspects of previous user activities, such as those with respect to one or more portions of content previously and/or currently stored by the CM System on behalf of one or more users. The routine proceeds to block 430.

At block 430, a processor-based device initiates the deletion of one or more portions of media content based on the quantity of storage space determined in block 426. As described in greater detail elsewhere herein, in at least certain embodiments the selection of which portions of media content to delete may be performed based at least in part on an analysis of previous user activities and/or on one or more retention priorities assigned to such media content by the CM System.

If in block 424 it was determined that the information or request received in block 402 did not comprise an indication of low storage space, the routine proceeds to block 434, in which a processor-based device performs one or more additional appropriate operations responsive to the received information or request.

Following blocks 422, 430, or 434, the routine proceeds to block 450, in which a processor-based device optionally performs one or more housekeeping tasks. In various scenarios and embodiments, such housekeeping tasks may include, as non-limiting examples, data analysis regarding any indicated user activities initiated or requested with respect to the CM System; storage optimization, such as compression, defragmentation, or modifying a partition structure of one or more storage devices; modification of one or more user profiles; or other action.

The routine then proceeds to block 456, in which a processor-based device determines whether to continue, such as in response to a request to shut down one or more functions of the CM System. If it is determined to continue, the routine returns to block 402 to await additional information or requests; otherwise, the routine proceeds to block 499 and ends.

It will be appreciated that in various alternative embodiments, methods of managing media content storage priority and retention in accordance with techniques presented herein may contain additional acts not shown in FIG. 4, may not contain all of the acts shown in FIG. 4, may perform acts shown in FIG. 4 in various orders other than that currently depicted, and may be modified in various respects.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

In at least one embodiment, a method may be summarized as receiving one or more indications of previous user activity regarding multiple portions of content stored via one or more storage devices of a content management system, the previous user activity including previous user deletion selections of one or more of the multiple portions of content; receiving an indication of low available storage space on the one or more storage devices; responsive to receiving the indication of low available storage space and, based at least in part on the previous user deletion selections, determining a quantity of storage space on the one or more storage devices to make available; and, based at least in part on the determined quantity of storage space to make available, initiating deletion of at least one portion of content currently stored via the one or more storage devices.

Receiving the indication of low available storage space may include determining that a quantity of available storage space on the one or more storage devices is below a selected threshold.

Determining a quantity of storage space on the one or more storage devices to make available based at least in part on the previous user deletion selections may include determining a quantity of storage space to make available based on a frequency of the previous user deletion selections.

The previous user activity may further include previous user viewing selections of one or more of the multiple portions of content, and the method may further include assigning, based at least in part on the previous user activity, a retention priority to one or more portions of content currently stored via the one or more storage devices.

The method may further include maintaining information regarding previous user activity with respect to multiple users of the content management system, and assigning a retention priority to the one or more portions of currently stored content may be further based at least in part on a respective priority level associated with each of the multiple users. The method may further include assigning the respective priority level to each of at least some users of the multiple users based at least in part on the previous user activities associated with each of the at least some users. Initiating deletion of the at least one portion of currently stored content may be further based on the retention priority assigned to the one or more portions of currently stored content.

In accordance with at least one embodiment, a content management system may be summarized as including one or more processors; one or more storage devices; and a computer-readable storage medium having stored instructions that, when executed by the one or more processors, cause the one or more processors to: receive one or more indications of previous user activity regarding multiple portions of content stored via one or more storage devices of a content management system, the previous user activity including previous user deletion selections of one or more of the multiple portions of content; receive an indication of low available storage space on the one or more storage devices; responsive to receiving the indication of low available storage space and based at least in part on the previous user deletion selections, determine a quantity of storage space on the one or more storage devices to make available; and, based at least in part on the determined quantity of storage space to make available, initiate deletion of at least one portion of content currently stored via the one or more storage devices.

The stored instructions may further cause the one or more processors to determine that a quantity of available storage space on the one or more storage devices is below a selected threshold.

To determine a quantity of storage space on the one or more storage devices to make available based at least in part on the previous user deletion selections may include to determine a quantity of storage space to make available based on a frequency of the previous user deletion selections.

The previous user activity may further include previous user viewing selections of one or more of the multiple portions of content, and the stored instructions may further cause the one or more processors to assign, based at least in part on the previous user activity, a retention priority to one or more portions of content currently stored via the one or more storage devices. The stored instructions may further cause the one or more processors to maintain information regarding previous user activity with respect to multiple users of the content management system, and to assign the retention priority to the one or more portions of currently stored content may be further based at least in part on a respective priority level associated with each of the multiple users. To assign the respective priority level to each of at least some users of the multiple users may be based at least in part on the previous user activities associated with each of the at least some users. To initiate deletion of the at least one portion of currently stored content may include to initiate deletion of the at least one portion based on the retention priority assigned to the one or more portions of currently stored content.

In accordance with at least one additional embodiment, a non-transitory computer-readable storage medium may be summarized as having stored instructions that, when executed by one or more computer processors, cause the one or more computer processors to perform various automated operations. The automated operations may include to receive one or more indications of previous user activity regarding multiple portions of content stored via one or more storage devices of a content management system, such that the previous user activity includes previous user deletion selections of one or more of the multiple portions of content; to receive an indication of low available storage space on the one or more storage devices; to determine, responsive to receiving the indication of low available storage space and based at least in part on the previous user deletion selections, a quantity of storage space on the one or more storage devices to make available; and, based at least in part on the determined quantity of storage space to make available, to initiate deletion of at least one portion of content currently stored via the one or more storage devices.

The stored instructions may further cause the one or more computer processors to determine that a quantity of available storage space on the one or more storage devices is below a selected threshold.

To determine a quantity of storage space on the one or more storage devices to make available based at least in part on the previous user deletion selections may include to determine a quantity of storage space to make available based on a frequency of the previous user deletion selections.

The previous user activity may further include previous user viewing selections of one or more of the multiple portions of content, and the stored instructions may further cause the one or more computer processors to assign, based at least in part on the previous user activity, a retention priority to one or more portions of content currently stored via the one or more storage devices. The stored instructions may further cause the one or more computer processors to maintain information regarding previous user activity with respect to multiple users of the non-transitory computer-readable storage medium, and to assign the retention priority to the one or more portions of currently stored content may be further based at least in part on a respective priority level associated with each of the multiple users. To assign the respective priority level to each of at least some users of the multiple users may be based at least in part on the previous user activities associated with each of the at least some users. To initiate deletion of the at least one portion of currently stored content may include to initiate deletion of the at least one portion based on the retention priority assigned to the one or more portions of currently stored content.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
receiving one or more indications of previous user activity regarding multiple portions of content stored via one or more storage devices of a content management system, the previous user activity including previous user deletion selections of one or more of the multiple portions of content;
receiving an indication of low available storage space on the one or more storage devices;
responsive to receiving the indication of low available storage space and based at least in part on the previous user deletion selections, determining a quantity of storage space on the one or more storage devices to make available; and
based at least in part on the determined quantity of storage space to make available, initiating deletion of at least one portion of content currently stored via the one or more storage devices.

2. The method of claim 1, wherein receiving the indication of low available storage space includes determining that a quantity of available storage space on the one or more storage devices is below a selected threshold.

3. The method of claim 1, wherein determining a quantity of storage space on the one or more storage devices to make available based at least in part on the previous user deletion selections includes determining a quantity of storage space to make available based on a frequency of the previous user deletion selections.

4. The method of claim 1 wherein the previous user activity further includes previous user viewing selections of one or more of the multiple portions of content, and wherein the method further comprises assigning, based at least in part on the previous user activity, a retention priority to one or more portions of content currently stored via the one or more storage devices.

5. The method of claim 4, further comprising maintaining information regarding previous user activity with respect to multiple users of the content management system, and wherein assigning a retention priority to the one or more portions of currently stored content is further based at least in part on a respective priority level associated with each of the multiple users.

6. The method of claim 5, further comprising assigning the respective priority level to each of at least some users of the multiple users based at least in part on the previous user activities associated with each of the at least some users.

7. The method of claim 4, wherein initiating deletion of the at least one portion of currently stored content is further based on the retention priority assigned to the one or more portions of currently stored content.

8. A content management system, comprising:
one or more processors;
one or more storage devices;
a computer-readable storage medium having stored instructions that, when executed by the one or more processors, cause the one or more processors to:
receive one or more indications of previous user activity regarding multiple portions of content stored via one or more storage devices of a content management system, the previous user activity including previous user deletion selections of one or more of the multiple portions of content;
receive an indication of low available storage space on the one or more storage devices;
responsive to receiving the indication of low available storage space and based at least in part on the previous user deletion selections, determine a quantity of storage space on the one or more storage devices to make available; and
based at least in part on the determined quantity of storage space to make available, initiate deletion of at least one portion of content currently stored via the one or more storage devices.

9. The content management system of claim 8, wherein the stored instructions further cause the one or more processors to determine that a quantity of available storage space on the one or more storage devices is below a selected threshold.

10. The content management system of claim 8, wherein to determine a quantity of storage space on the one or more storage devices to make available based at least in part on the previous user deletion selections includes to determine a quantity of storage space to make available based on a frequency of the previous user deletion selections.

11. The content management system of claim 8, wherein the previous user activity further includes previous user viewing selections of one or more of the multiple portions of content, and wherein the stored instructions further cause the one or more processors to assign, based at least in part on the previous user activity, a retention priority to one or more portions of content currently stored via the one or more storage devices.

12. The content management system of claim 11, wherein the stored instructions further cause the one or more processors to maintain information regarding previous user activity with respect to multiple users of the content management system, and wherein to assign the retention priority to the one or more portions of currently stored content is further based at least in part on a respective priority level associated with each of the multiple users.

13. The content management system of claim 12, wherein to assign the respective priority level to each of at least some users of the multiple users is based at least in part on the previous user activities associated with each of the at least some users.

14. The content management system of claim 11, wherein to initiate deletion of the at least one portion of currently stored content includes to initiate deletion of the at least one portion based on the retention priority assigned to the one or more portions of currently stored content.

15. A non-transitory computer-readable storage medium having stored instructions that, when executed by one or more computer processors, cause the one or more computer processors to:

receive one or more indications of previous user activity regarding multiple portions of content stored via one or more storage devices of a content management system, the previous user activity including previous user deletion selections of one or more of the multiple portions of content;

receive an indication of low available storage space on the one or more storage devices;

responsive to receiving the indication of low available storage space and based at least in part on the previous user deletion selections, determine a quantity of storage space on the one or more storage devices to make available; and based at least in part on the determined quantity of storage space to make available, initiate deletion of at least one portion of content currently stored via the one or more storage devices.

16. The non-transitory computer-readable storage medium of claim 15, wherein the stored instructions further cause the one or more computer processors to determine that a quantity of available storage space on the one or more storage devices is below a selected threshold.

17. The non-transitory computer-readable storage medium of claim 15, wherein to determine a quantity of storage space on the one or more storage devices to make available based at least in part on the previous user deletion selections includes to determine a quantity of storage space to make available based on a frequency of the previous user deletion selections.

18. The non-transitory computer-readable storage medium of claim 15, wherein the previous user activity further includes previous user viewing selections of one or more of the multiple portions of content, and wherein the stored instructions further cause the one or more computer processors to assign, based at least in part on the previous user activity, a retention priority to one or more portions of content currently stored via the one or more storage devices.

19. The non-transitory computer-readable storage medium of claim 18, wherein the stored instructions further cause the one or more computer processors to maintain information regarding previous user activity with respect to multiple users of the non-transitory computer-readable storage medium, and wherein to assign the retention priority to the one or more portions of currently stored content is further based at least in part on a respective priority level associated with each of the multiple users.

20. The non-transitory computer-readable storage medium of claim 19, wherein to assign the respective priority level to each of at least some users of the multiple users is based at least in part on the previous user activities associated with each of the at least some users.

21. The non-transitory computer-readable storage medium of claim 18, wherein to initiate deletion of the at least one portion of currently stored content includes to initiate deletion of the at least one portion based on the retention priority assigned to the one or more portions of currently stored content.

* * * * *